(12) United States Patent
Muramatsu et al.

(10) Patent No.: US 6,900,837 B2
(45) Date of Patent: May 31, 2005

(54) IMAGE SENSOR AND PIXEL READING METHOD USED THIS IMAGE SENSOR

(75) Inventors: Yoshinori Muramatsu, Tokyo (JP); Hidemitsu Nikou, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 750 days.

(21) Appl. No.: 09/735,539

(22) Filed: Dec. 14, 2000

(65) Prior Publication Data

US 2001/0005226 A1 Jun. 28, 2001

(30) Foreign Application Priority Data

Dec. 24, 1999 (JP) ............................................ 11-367396

(51) Int. Cl.$^7$ .......................... H04N 9/64; H04N 5/335
(52) U.S. Cl. ...................... 348/243; 348/243; 348/257; 348/308
(58) Field of Search ............................ 348/207.99, 241, 348/243, 245, 251, 222.1, 257, 294, 308, 304; 250/208.1

(56) References Cited

U.S. PATENT DOCUMENTS

| | | | | |
|---|---|---|---|---|
| 5,262,871 A | * | 11/1993 | Wilder et al. | 348/307 |
| 6,181,375 B1 | * | 1/2001 | Mitsui et al. | 348/240.99 |
| 6,323,900 B1 | * | 11/2001 | Kobayashi | 348/241 |
| 6,525,769 B1 | * | 2/2003 | Thomas et al. | 348/243 |
| 2003/0025817 A1 | * | 2/2003 | Yonemoto et al. | 348/308 |

FOREIGN PATENT DOCUMENTS

| | | |
|---|---|---|
| JP | 63-232768 | 9/1988 |
| JP | 9-163244 | 6/1997 |
| JP | 9-224196 | 8/1997 |
| JP | 10-164363 | 6/1998 |
| JP | 11-088692 | 3/1999 |
| JP | 11-112885 | 4/1999 |
| JP | 11-196332 | 7/1999 |
| JP | 11-196335 | 7/1999 |
| JP | 2001-45383 | 2/2001 |

* cited by examiner

Primary Examiner—Tuan Ho
(74) Attorney, Agent, or Firm—Foley & Lardner LLP

(57) ABSTRACT

An image sensor and a pixel reading method used this image sensor, in which the accuracy of a black level can be increased by that an optical black region being the black level reference of signals is read every horizontal line at a local or random access mode, are provided. And also the structure of a camera system used this image sensor can be simplified is provided. The image sensor is a MOS type image sensor composed of a pixel array region and an optical black region disposed at the one end in the pixel array region. And the MOS type image sensor provides a mode selector that selects the local access or random access mode or a frame access mode. When the local access or random access mode is activated, the image sensor decides a pixel reading region in the pixel array region. The image sensor reads information of one or more pixels having a designated horizontal line address in the pixel reading region every horizontal line address. After this, the MOS type image sensor reads information of one or more pixels having the same designated horizontal line address in the optical black region.

8 Claims, 6 Drawing Sheets

IMAGE SENSOR AND PIXEL READING METHOD USED THIS IMAGE SENSOR

BACKGROUND OF THE INVENTION

The present invention relates to an image sensor and a pixel reading method used this image sensor, in particular, in which a metal oxide semiconductor (MOS) type image sensor, which is capable of adopting a local access mode or a random access mode in addition to a frame access mode, is used.

DESCRIPTION OF THE RELATED ART

A MOS type image sensor is different from a charge coupled device (CCD) image sensor that needs a specified manufacturing process, and can be manufactured by a standard MOS manufacturing process. And the MOS type image sensor has a low power consumption characteristic by its low voltage and single power source operation. And further the MOS type image sensor has an advantage that its peripheral logic circuit and macro circuit can be formed in one chip. Therefore, the MOS type image sensor has been largely studied.

FIG. 1 is a block diagram showing a structure of a camera system used a conventional complementary metal oxide semiconductor (CMOS) type image sensor. As shown in FIG. 1, a camera system 200 consists of a CMOS type image sensor 101, a gain control amplifier (GCA) 2, an analog to digital converter (ADC) 3, and an optical black (OB) correction circuit 4.

A signal outputted from the CMOS type image sensor 101 is amplified at the GCA 2, and the amplified signal is converted to a digital signal at the ADC 3, and the digital signal is outputted.

At this time, the OB correction circuit 4 stores an optical black signal outputted from the CMOS type image sensor 101, and executes a signal process that makes the optical black signal be a black level reference for a signal reading a pixel array. And there is a case that various signal processes are applied to the digital signal outputted from the camera system 200.

And also there is a case that the GCA 2, the ADC 3, and the OB correction circuit 4 are integrated on one chip where the CMOS type image sensor 101 is formed, and the camera system 200 is formed.

FIG. 2 is a block diagram showing a structure of the conventional CMOS type image sensor 101 of the camera system 200 shown in FIG. 1.

At the camera system 200 used the conventional CMOS type image sensor 101, as shown in FIG. 2, generally, information of all pixels 12 in a pixel array region 11 is read sequentially. At this time, based on address information inputted to an address input terminal AD, for one horizontal line 2n selected through a horizontal line address decoder 5 and a horizontal line selection shift register 6, each of the pixels 12 disposed from the vertical line addresses 31 to 3z is selected sequentially by a vertical line address decoder 7 and a vertical line selection shift register 8. And information of selected each of the pixels 12 is read. After information of all the pixels 12 in the selected horizontal line 2n is read, information of pixels (OB cells) 14, disposed in the selected horizontal line 2n in an optical black region 40 disposed adjacent to the pixel array region 11, is read, in case of the frame access mode, which reads all pixels in the selected horizontal line.

The CMOS type image sensor is different from the CCD image sensor, at the CMOS type image sensor, it is easy to access to each of the pixels 12 in the pixel array region 11, therefore a local access or a random access is possible in addition to a frame access. Therefore, when a local access mode signal or a random access mode signal is inputted to a command signal input terminal CM, and at the same time when address information specified pixels to be selected or address information that makes only pixels of a designated region read selectively by specifying a region is inputted to the address input terminal AD, for example, a pixel reading region 50 expressing a designated rectangle part is set. And information of only pixels 12' in the pixel reading region 50 can be read selectively.

However, at the camera system 200 used the conventional CMOS type image sensor 101 shown FIG. 1, as shown in FIG. 2, when the local access process or the random access process is applied to the pixel reading region 50, the pixels 12' in selected vertical line addresses from 3n to 3m in selected horizontal line addresses 2I, 2I+1, . . . in the pixel reading region 50 are read. But (OB cells) pixels 14 in the optical black region 40 corresponding to the horizontal line addresses 2I, 2I+1, . . . are not read, and only the pixels 14 in the optical black region 40 corresponding to arbitrary addresses give from the outside are read.

FIG. 3 is a timing chart showing operation timing of the conventional CMOS type image sensor.

As shown in FIGS. 2 and 3, at the conventional CMOS type image sensor, when a local (or random) access mode is selected by a command CM inputted through the command signal input terminal CM from the outside, a pixel reading region 50 being an arbitrary rectangle part is selected by an address signal AD from the outside. And at the time when pixels 12' are accessed at local (or at random), the access starting horizontal line 2I is selected by the horizontal line address decoder 5 and the vertical line address decoder 7, and the vertical line addresses 3n, . . . 3m are sequentially activated in the horizontal direction by the vertical line selection shift register 8. With this, a local array signal of one line of the selected horizontal line address 2I is outputted to, for example, a buffer memory disposed in the outside.

After accessed one horizontal line, the horizontal line selection shift register 6 makes the horizontal line address+1, that is, a horizontal line 2I+1 is selected, and an equivalent vertical line access process to the process mentioned above is applied to the pixel reading region 50 being the arbitrary rectangle part.

At this time, at the optical black region 40, the pixels 14 are not read at every horizontal line, therefore the optical black (OB) correction can not be executed every horizontal line, consequently, the accuracy of the black level is deteriorated.

At the frame access process, the optical black region 40 is read every horizontal line, however, at the local (or random) access mode, the optical black region 40 is not read every horizontal line, therefore there is a disadvantage that a process handling the optical black region 40 must be changed at the local (or random) access mode.

Japanese Patent Application Laid-Open No. HEI 11-112885 discloses a camera. In this application, at a method in which image signals taken by a CCD camera are divided into blocks and the divided image signals are compressed and expanded, a method to process the border part between a pixel array region and an optical black region is described. However, a technology to execute an optical black correction by using a MOS type image sensor is not described.

And Japanese Patent Application Laid-Open No. HEI 10-164363 discloses an image reading apparatus. In this application, when an image is taken by an image sensor, a technology, in which a shading correction is executed by averaging white data and black data, is described. However, a technology to execute an optical black correction by using a MOS type image sensor is not described.

And Japanese Patent Application Laid-Open No. HEI 11-88692 discloses an image reading apparatus. In this application, at an optical black correction for signals outputted from a line image sensor, a method, in which black image data are formed by that the most approximate value to the black level from the outputs of each pixel when plural lines are read, is memorized every pixels, is described. However, at a two dimensional MOS type image sensor, a technology, in which pixels are read at a local access mode or a random access mode, is not described.

SUMMARY OF THE INVENTION

It is therefore an object of the present invention to provide an image sensor and a pixel reading method used this image sensor, in which the accuracy of a black level can be increased by that an optical black region being the black level reference of signals is read every horizontal line at a local or random access mode, and also the structure of a camera system used this image sensor can be simplified.

According to a first aspect of the present invention, there is provided an image sensor, which is a MOS type image sensor composed of a pixel array region and an optical black region disposed at the one end in the pixel array region. The image sensor provides a mode selection means for selecting a local access mode that selects a local part of the pixel array region or a random access mode that selects a part of the pixel array region at random or a frame access mode that selects all of the pixel array region and a pixel reading region deciding means for deciding a pixel reading region in which one or more pixels whose information is read are disposed in the pixel array region, in case that the mode selection means selects the local access mode or the random access mode. And every one selected horizontal line address in the pixel reading region, information of the one or more pixels in the selected horizontal line address in the pixel reading region is read, and after this, information of one or more pixels in the selected one horizontal line address in the optical black region is read.

According to a second aspect of the present invention, an image sensor, which is a MOS type image sensor composed of a pixel array region and an optical black region disposed at the one end in the pixel array region, is provided. The image sensor provides a mode selection means for selecting a local access mode that selects a local part of the pixel array region or a random access mode that selects a part of the pixel array region at random or a frame access mode that selects all of the pixel array region, a pixel reading region deciding means for deciding a pixel reading region in which one or more pixels whose information is read are disposed in the pixel array region, in case that the mode selection means selects the local access mode or the random access mode, and a control means for controlling to read information of one or more pixels in the pixel reading region and the optical black region. And the control means controls operation of; sequentially reading information of the one or more pixels having a designated horizontal line address in the pixel reading region in the pixel array region, after this, sequentially reading information of the one or more pixels having the designated horizontal line address in the optical black region, after this, sequentially reading information of one or more pixels having a different designated horizontal line address in the pixel reading region in the pixel array region, after this, sequentially reading information of one or more pixels having the different designated horizontal line address in the optical black region, after this, operation of the sequentially reading information is continued until the designated horizontal address reaches the end.

According to a third aspect of the present invention, an image sensor, which is a MOS type image sensor composed of a pixel array region and an optical black region disposed at the one end in the pixel array region, is provided. The image sensor provides a mode selection means for selecting a local access mode that selects a local part of the pixel array region or a random access mode that selects a part of the pixel array region at random or a frame access mode that selects all of the pixel array region, a pixel reading region deciding means for deciding a pixel reading region in which one or more pixels whose information is read are disposed in the pixel array region, in case that the mode selection means selects the local access mode or the random access mode, and a control means for controlling to read information of one or more pixels in the pixel reading region and the optical black region. And the control means controls operation of; selecting one horizontal line having a designated horizontal line address in the pixel reading region, reading information of one or more pixels having the designated horizontal line address in the pixel reading region in the pixel array region, after this, reading information of one or more pixels having the same designated horizontal line address in the optical black region, after this, selecting one different horizontal line having a different designated horizontal line address in the pixel reading region, reading information of one or more pixels having the different designated horizontal line address in the pixel reading region in the pixel array region, after this, reading information of one or more pixels having the same different designated horizontal line address in the optical black region, after this, the selecting one horizontal line and the reading information are continued until the designated horizontal address reaches the end.

According to a fourth aspect of the present invention, in the first, the second, and the third aspect, an image sensor further provides a pixel information read value correction means which corrects read values of the one or more pixels in the pixel reading region, by referring to information of pixels having a different horizontal line address in the optical black region read right before the time when information of one or more pixels having the designated selected horizontal address in the pixel reading region would be read, when information of one or more pixels having the designated selected horizontal line address in the pixel reading region is read, and a vertical line finished flag generating means which generates a vertical line finished flag when a final vertical line was selected in the designated selected horizontal line in the pixel reading region, and makes information of one or more pixels having the designated selected horizontal line in the optical black region read, and also outputs the vertical line finished flag to the pixel information read value correction means.

According to fifth aspect of the present invention, there is provided a pixel reading method, at an image sensor, which is a MOS type image sensor composed of a pixel array region and an optical black region disposed at the one end in the pixel array region. The pixel reading method provides the steps of; selecting a local access mode that selects a local part of the pixel array region or a random access mode that selects a part of the pixel array region at random or a frame access mode that selects all of the pixel array region, deciding a pixel reading region in which one or more pixels whose information is read are disposed in the pixel array region, in case that the local access mode or the random access mode is activated, and selecting one horizontal line having a designated horizontal line address in the pixel reading region, reading information of one or more pixels having the designated horizontal line address in the pixel reading region in the pixel array region, reading information of one or more pixels having the same designated horizontal line address in the optical black region, selecting one different horizontal line having a different designated horizontal line address in the pixel reading region, reading information of one or more pixels having the different designated horizontal line address in the pixel reading region in the pixel array region, reading information of one or more pixels having the same different designated horizontal line address in the optical black region, and continuing the selecting one horizontal line and reading information of one or more pixels in the pixel reading region and reading information of one or more pixels in the optical black region in the selected horizontal line until the designated horizontal address reaches the end.

According to a sixth aspect of the present invention, in the fifth aspect, the pixel reading method further provides the steps of; correcting read values of the one or more pixels in the pixel reading region, by referring to information of pixels having a different horizontal line address in the optical black region read right before the time when information of one or more pixels having the designated selected horizontal address in the pixel reading region would be read, when information of one or more pixels having the designated selected horizontal line address in the pixel reading region is read, and generating a vertical line finished flag when a final vertical line was selected in the designated selected horizontal line in the pixel reading region, and makes information of one or more pixels having the designated selected horizontal line in the optical black region read, and also outputting the vertical line finished flag to the pixel information read value correction step.

According to the present invention, at the pixel reading method used the image sensor, when the local or random access mode is activated, pixels in the optical black region being the black level for signals to be read are read every horizontal line. That is, the pixels in the selected horizontal line in the pixel reading region are read, and after this, one or more pixels in the same selected horizontal line in the optical black region are read. Therefore, an effect that the accuracy of the black level is increased can be obtained.

According to the present invention, the process for the optical black region can be the same between the frame access mode in which the OB cells are automatically read every horizontal line because all the pixels are read and the local access mode or the random access mode in which a certain number of OB cells are surely read until the horizontal line ends. Therefore, an effect that the structure of the camera system can be simplified is obtained.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
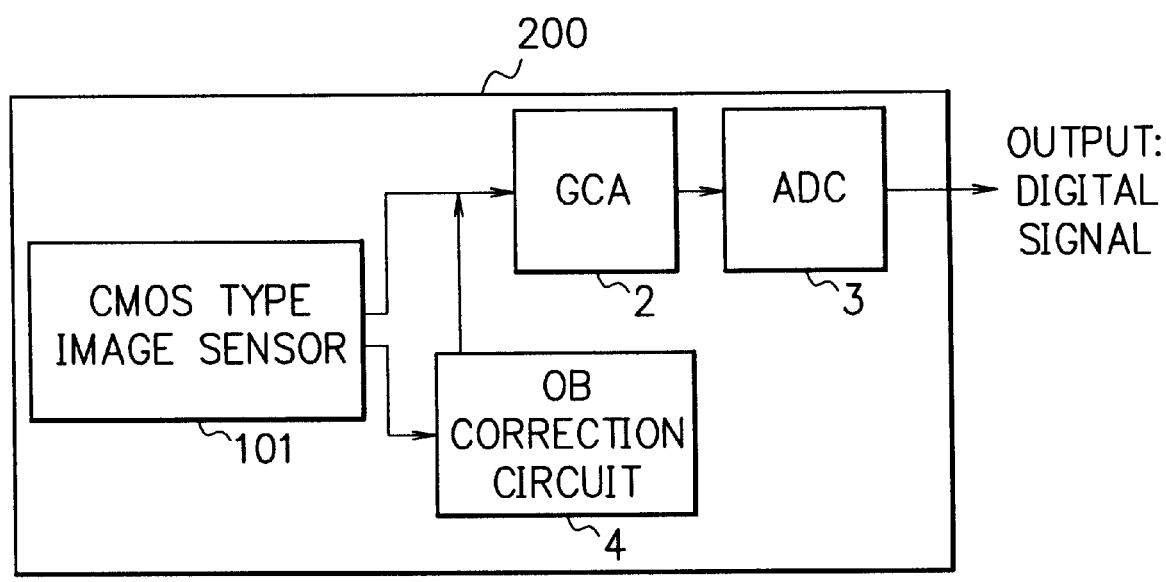
FIG. 1 is a block diagram showing a structure of a camera system used a conventional CMOS type image sensor.
Figure 2:
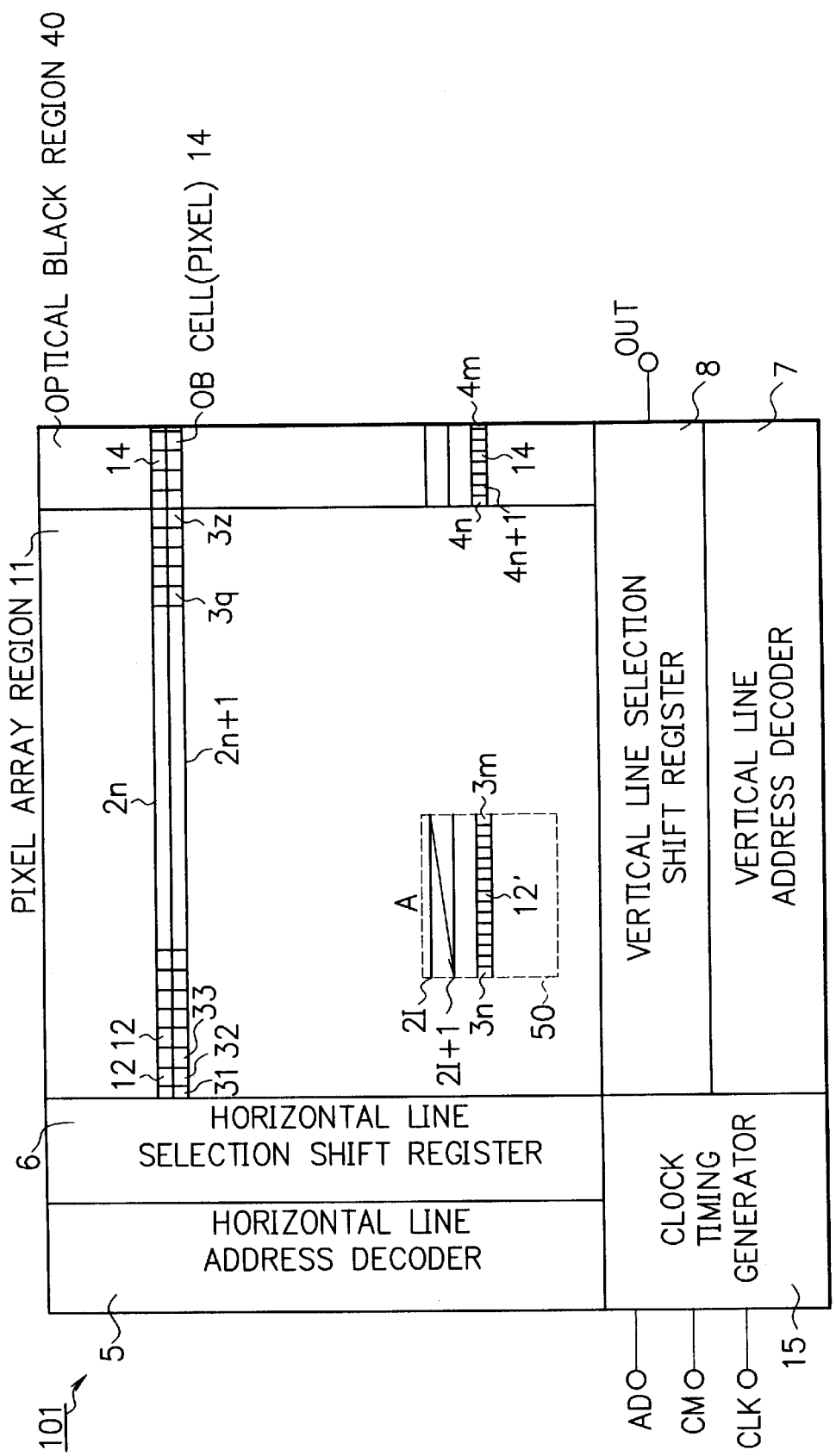
FIG. 2 is a block diagram showing a structure of the conventional CMOS type image sensor of the camera system shown in FIG. 1.
Figure 3:
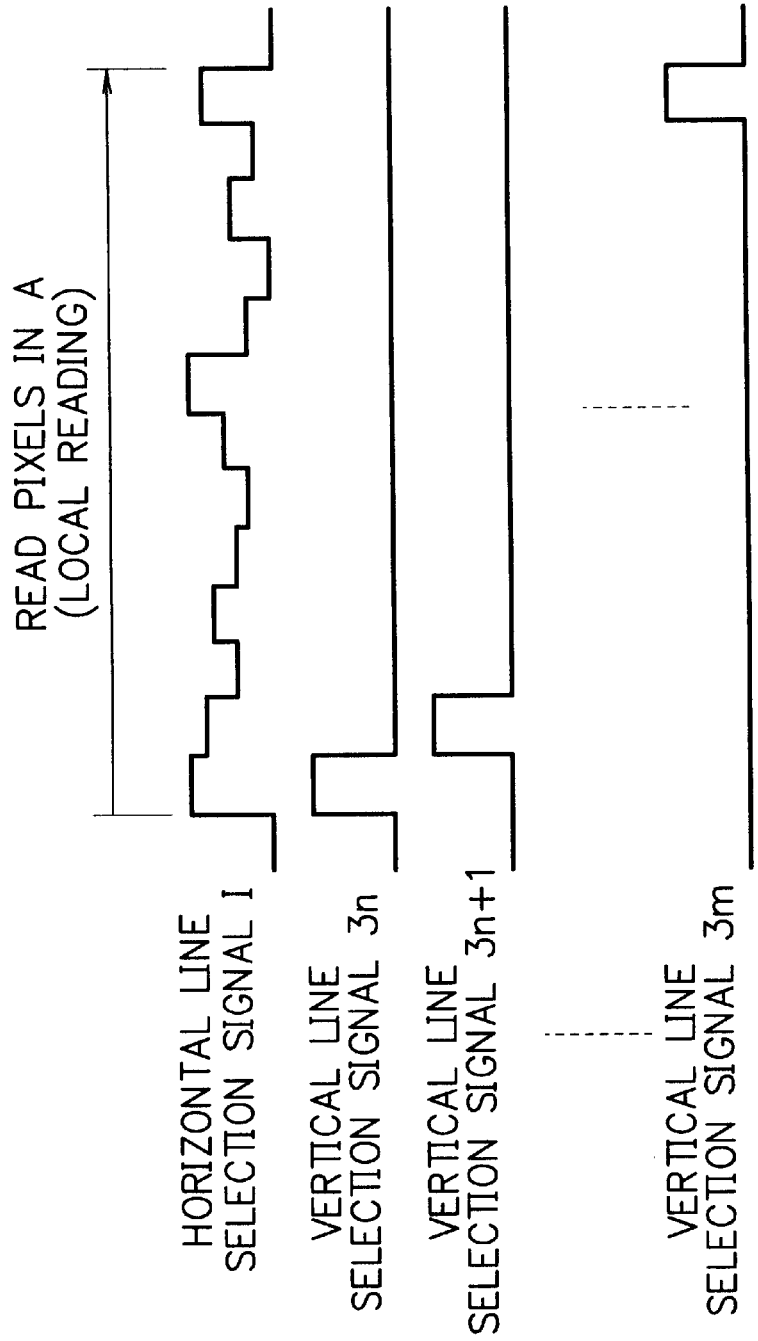
FIG. 3 is a timing chart showing operation timing of the conventional CMOS type image sensor.
Figure 4:
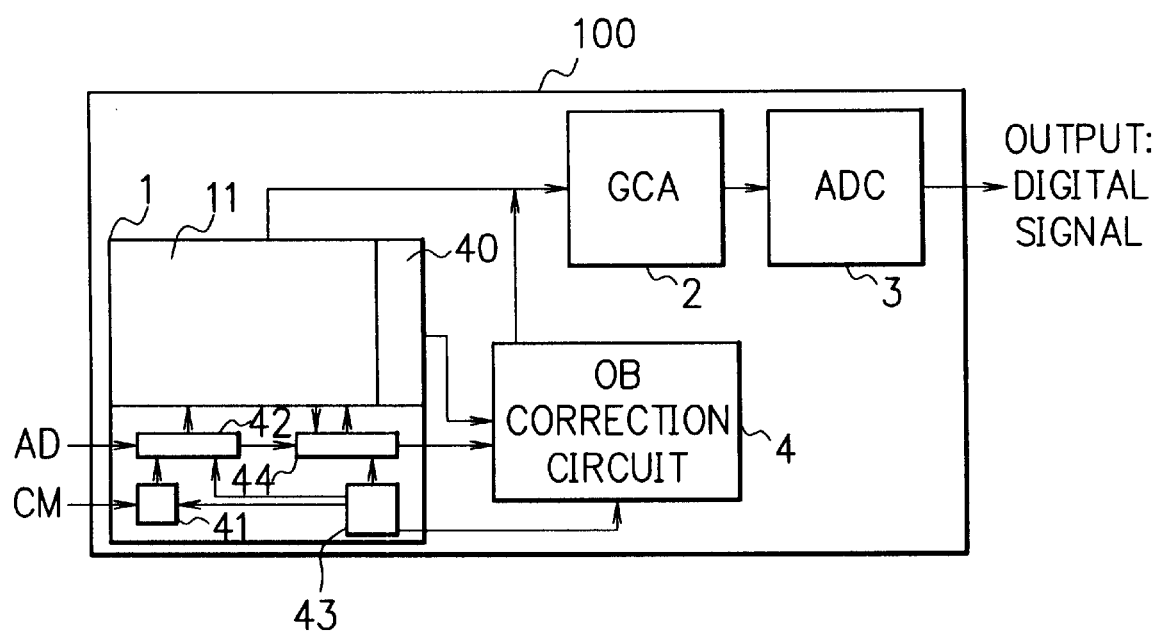
FIG. 4 is a block diagram showing a structure of a camera system used a MOS type image sensor of the present invention.
Figure 5:
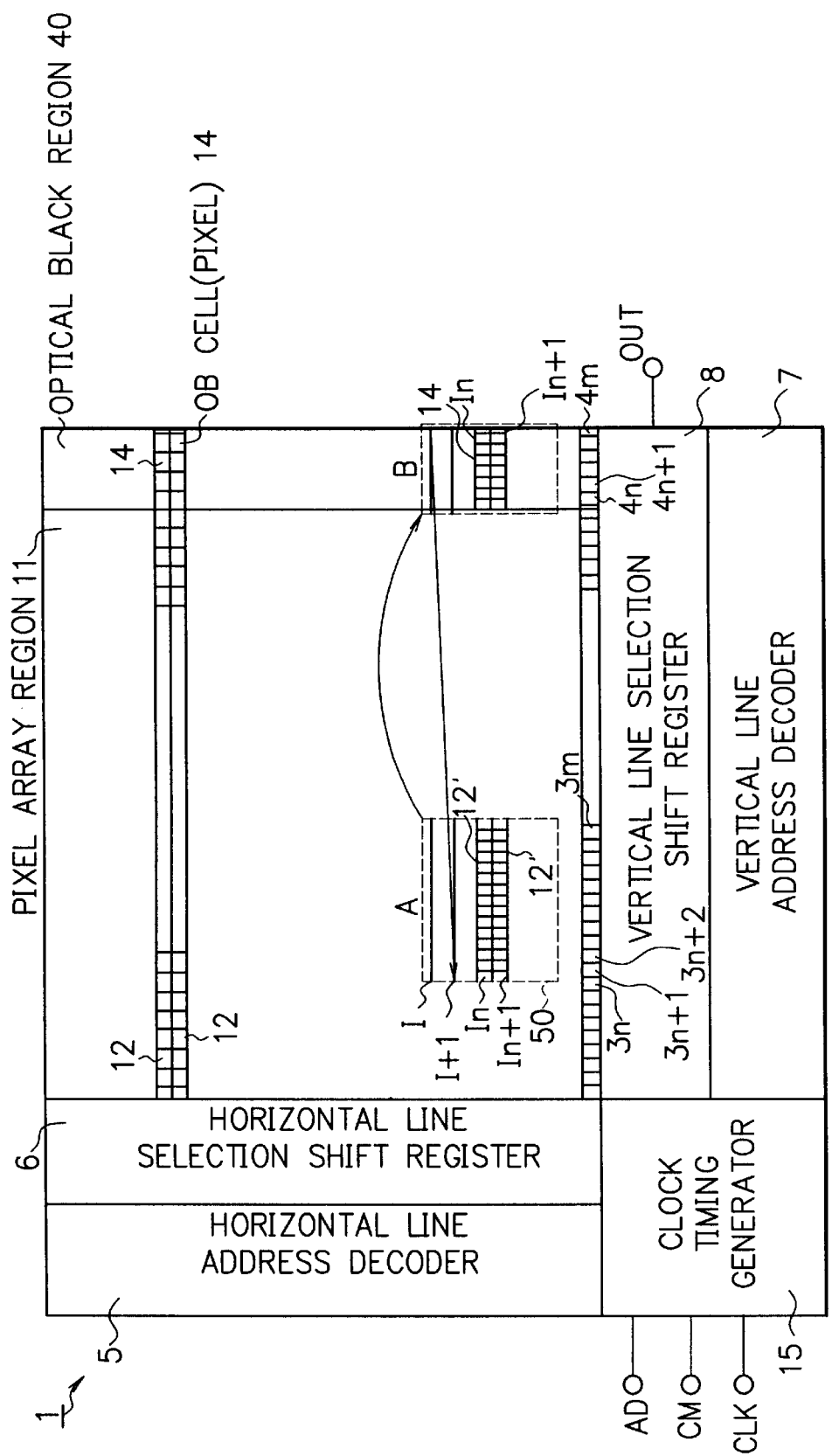
FIG. 5 is a block diagram showing a structure of the MOS type image sensor of the present invention.

Referring now to the drawings, embodiments of the present invention are explained in detail. FIG. 4 is a block diagram showing a structure of a camera system used a MOS type image sensor of the present invention. As shown in FIG. 4, a camera system 100 used the image sensor of the present invention consists of a MOS type image sensor 1, a gain control amplifier (GCA) 2, an analog to digital converter (ADC) 3, and an optical black (OB) correction circuit 4. And the MOS type image sensor 1 provides a mode selector 41, a pixel reading region deciding section 42, a controller 43, and a vertical line selection finished flag outputting section 44. And a signal outputted from the MOS type image sensor 1 is amplified at the GCA 2, and the amplified signal is converted to a digital signal at the ADC 3, and the digital signal is outputted. FIG. 5 is a block diagram showing a structure of the MOS type image sensor 1 of the present invention.

Referring to FIGS. 4, and 5, a first embodiment of the present invention is explained.

The MOS type image sensor 1 provides a pixel array region 11 and an optical black region 40 disposed in the one end part of the pixel array region 11. When the mode selector 41 selects a local access mode or a random access mode, the MOS type image sensor 1 decides a pixel reading region 50 in which one or more pixels 12 to be read are disposed in the pixel array region 11. And the MOS type image sensor 1 reads information in one or more pixels 12' disposed in a horizontal line address I selected in the pixel reading region 50 every selected one horizontal line address I. After this, the MOS type image sensor 1 reads information in one or more pixels 14 in the selected horizontal line address I in the optical black region 40. In this, the pixels 12' are the pixels 12 in the pixel reading region 50.

The structure of the camera system 100 used the MOS type image sensor 1 is explained in more detail. First, when the mode selector 41 selects the local access mode or the random access mode, the MOS type image sensor 1 sequentially reads information in one or more pixels 12' disposed in the horizontal line address I selected in the pixel reading region 50 in the pixel array region 11. After this, the MOS type image sensor 1 sequentially reads information in one or more pixels 14 in the selected horizontal line address I in the optical black region 40. Next, after read the information in the pixels 12' and 14 in the horizontal line address I, the MOS type image sensor 1 sequentially reads information in one or more pixels 12' disposed in a horizontal line address I+1 selected in the pixel reading region 50 in the pixel array region 11. After this, the MOS type image sensor 1 sequentially reads information in one or more pixels 14 in the selected horizontal line address I+1 in the optical black region 40. This process mentioned above is continued until the horizontal line address reaches to the end horizontal line in the pixel reading region 50 by changing the horizontal line address number.

In order to continue this process, the pixel reading region deciding section 42 decides the pixel reading region 50 in which one or more pixels 12' to be read are disposed in the pixel array region 11 in case that the mode selector 41 selects the local access or random access mode. And the controller 43 controls so that this pixel reading process can be continued. That is, first the MOS type image sensor 1 selects the horizontal line address I in the pixel reading region 50 and reads the information in the pixels 12' in the horizontal line address I in the pixel reading region 50, and after this, reads information in one or more pixels 14 in the selected horizontal line address I in the optical black region 40. Next, after read the information in the pixels 12' and 14 in the horizontal line address I, the MOS type image sensor 1 selects the horizontal line address I+1 in the pixel reading region 50 and reads the information in the pixels 12' in the horizontal line address I+1 in the pixel reading region 50, and after this, reads information in one or more pixels 14 in the selected horizontal line address I+1 in the optical black region 40. This process is controlled by the controller 43 until the horizontal line address reaches to the end horizontal line in the pixel reading region 50 by changing the horizontal line address number.

At the camera system 100 used the MOS type image sensor 1 of the present invention, when the information in one or more pixels 12' in the selected horizontal line address in the pixel reading region 50 is read, the optical black (OB) correction circuit 4 is provided. The OB correction circuit 4 corrects the read information in the horizontal line address I+1 by referring the information in the pixels 14 in the horizontal line address I in the optical black region 40. That is, this referring information was read right before that the information in the horizontal line address I+1 would be read.

At the MOS type image sensor 1 of the present invention, the vertical line selection finished flag outputting section 44 is used effectively. The vertical line selection finished flag outputting section 44 generates a vertical line selection finished flag F by corresponding to the final vertical line address 3m in the selected horizontal line address I in the pixel reading region 50. By using this vertical line selection finished flag F, the pixels 14 in the optical black region 40 in the selected horizontal line address I are read. And also, the vertical line selection finished flag F is outputted to the OB correction circuit 4.

Referring to FIGS. 4 and 5, operation of the MOS type image sensor 1 of the present invention is explained in more detail.

When a local or random access mode is selected by an input of a command CM from the outside, the mode selector 41 confirms the kind of the inputted mode. And corresponding to an address signal AD from the outside, a pixel reading region 50 being an arbitrary rectangle part shown in FIG. 5 is selected by the pixel reading region deciding section 42. When a pixel array is accessed at local or at random, an access starting horizontal line is selected by the horizontal line address decoder 5 and the vertical line address decoder 7. And a local (or random) array signal of one horizontal line is sequentially outputted to the outside by that a vertical line selection shift register 8 sequentially activates vertical line selection signals 3n, 3n+1, . . . 3m in the horizontal line direction.

At this time, when the vertical line selection signal 3m in the signals 3n, 3n+1, . . . 3m and the final vertical line address 3m become equal, the vertical line selection finished flag outputting section 44 outputs a vertical line finished flag F. And after all of the pixels 12' (A part in FIG. 5) in the designated horizontal line address in the pixel reading region 50 were read, OB selection signals 4n, 4n+1, . . . are sequentially activated and pixels (OB cells) 14 (B part in FIG. 5) being the black level reference for signals are outputted.

After one horizontal line was accessed, +1 is added to the horizontal line selection shift register 6, the mentioned above operation for the vertical line address is executed in the pixel reading region 50 being the arbitrary rectangle part. With this operation, the pixels (OB cells) 14 in the optical black region 40 are read every horizontal line, at the time after the pixels 12' in the selected horizontal line address in the pixel reading region 50 were read.

As mentioned above, even at the time of the local access mode or the random access mode, the optical black region 40 being the black level reference for signals is read every horizontal line, therefore an effect that the accuracy of the black level is increased can be obtained.

And at the frame access mode and at the local or random access mode, the operation for the optical black region 40 can be made to be the same. Because at the frame access mode, all pixels are read and the pixels (OB cells) 14 are automatically read every horizontal line, and at the local or random access mode, after the pixels of one horizontal line were read, a certain number of the pixels (OB cells) 14 in the optical black region 40 are surely read every horizontal lines. Therefore, there is an effect that the structure of the camera system 100 can be simplified.

Referring to FIG. 5, operation of the MOS type image sensor 1 of the present invention is explained in more detail. The MOS type image sensor 1 provides a main clock (CLK) input terminal, a command (CM) input terminal, and an address (AD) input terminal. The main CLK input terminal receives a main clock being the reference for the internal operation from the outside. The CM input terminal receives commands, for example, a command changing operation between the frame access mode and the local or random access mode from the outside. The AD input terminal receives an address that decides the region from where the pixels are read at the local or random access mode. Signals inputted from these input terminals are received at a clock timing generator 15, and the clock timing generator 15 generates clocks and timing for the internal operation. And the clock timing generator 15 outputs the generated clocks and timing to the horizontal line address decoder 5, the horizontal line selection shift register 6, the vertical line address decoder 7, and the vertical line selection shift register 8. And information in the designated pixels 12 in an arbitrary pixel array region 11 is read by the operation of the horizontal line address decoder 5, the horizontal line selection shift register 6, the vertical line address decoder 7, and the vertical line selection shift register 8. And the read information is outputted from an output terminal.

In the pixel array region 11, photoelectric conversion elements, which receive light and convert the received light to electric signals, are disposed in a two dimensional matrix state. And a part of the photoelectric conversion elements is covered with a light shielding film, generally this part is the right end part of the pixel array region 11. This light shielded part is a pixel array, which outputs a reference level in case that light is not always received. This light shielded part is called an optical black region.

At the camera system 100 shown in FIG. 4, the optical black region 40 is used as the black level reference for the black level correction (OB correction).

Figure 6:
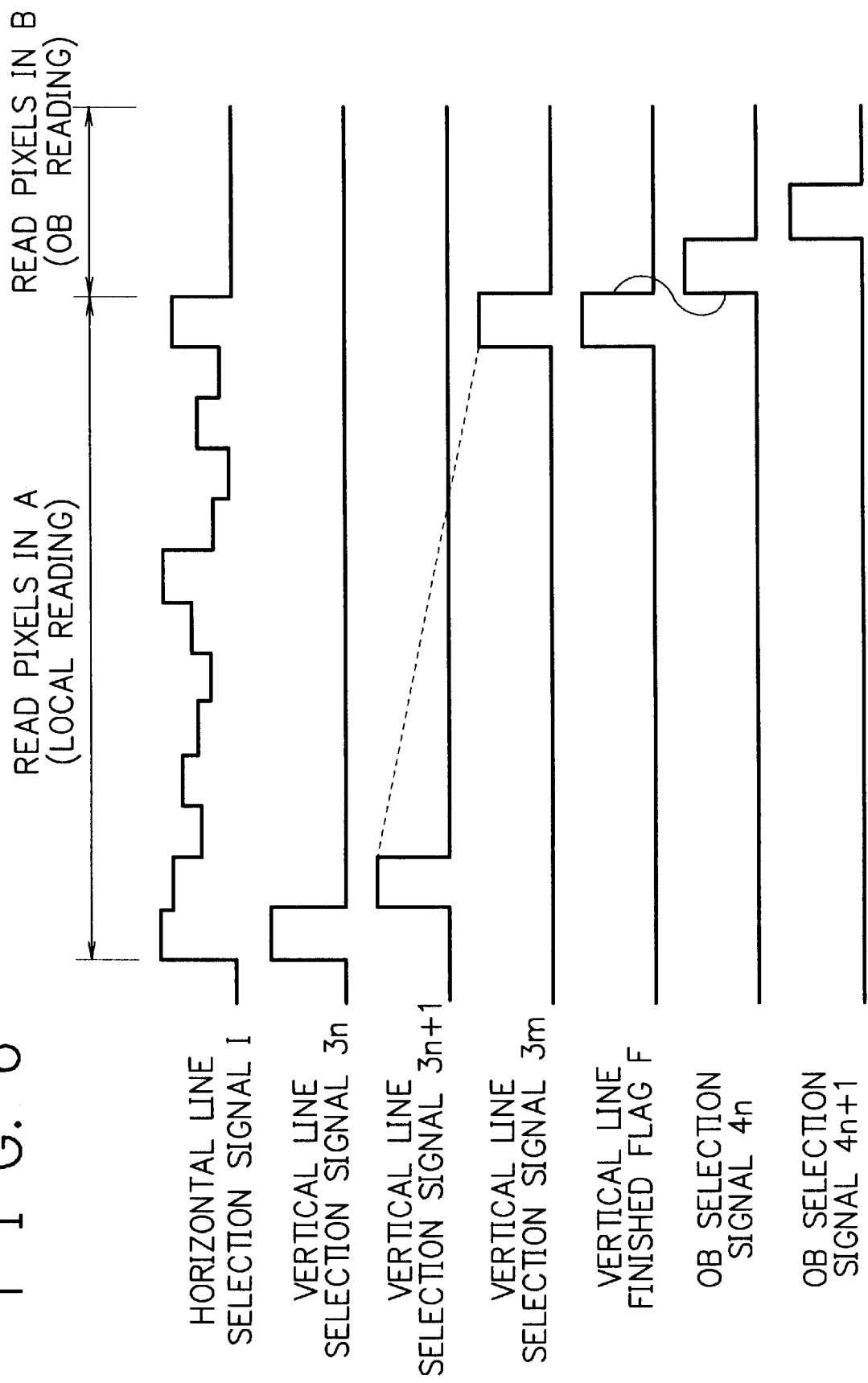
FIG. 6 is a timing chart showing processes reading an image at the MOS type image sensor of the present invention.

FIG. 6 is a timing chart showing processes reading an image at the MOS type image sensor 1 of the present invention. Referring to FIGS. 4, 5, and 6, operation of the MOS type image sensor 1 in the camera system 100 of the present invention is explained.

First, when the mode selector 41 selects a local (random) access mode by that a command CM is inputted from the outside, a pixel reading region 50 being an arbitrary rectangle part is selected at the pixel reading region deciding section 42, corresponding to an arbitrary inputted address AD. In case that a pixel array is selected at local or at random, a horizontal line address I, from which the access is started, is selected by the horizontal line address decoder 5 and the vertical line address decoder 7.

By the vertical line selection shift register 8, a vertical line selection signal 3n, a vertical line selection signal 3n+1, ..., are sequentially activated in the selected horizontal line address I. With this operation, local array signals of one horizontal line I is outputted to the outside.

When the vertical line selection signal and the final vertical line address become equal, a vertical line finished flag F is outputted and the final pixel 12' in the horizontal line I in the pixel reading region 50 (A part in FIG. 5) being the local reading region is read. After this, an OB selection signal 4n, an OB selection signal 4n+1, ..., in the horizontal line address I in the optical black region 40 are activated. With this process, one or more pixels 14 in the horizontal line I in the optical black region 40 (B part in FIG. 5) being the local reading region are read. And the average of the read pixels 14 is made to be the black level reference for each of the pixel reading signals.

After the horizontal line I was accessed, the horizontal line selection shift register 6 is made to be +1, and the same process as mentioned above is applied to a horizontal line address I+1 in the pixel reading region 50 being the rectangle part, and the pixels 12' in the horizontal line I+1 are read. And after this, the pixels 14 in the horizontal line address I+1 in the optical black region 40 are read. This process is continued until the horizontal line reaches to the end line in the pixel reading region 50 by changing the horizontal line address number.

In this, as the black level correction method using at the MOS type image sensor 1 of the present invention, the conventional technology is used. For example, first, the MOS type image sensor 1 reads voltage values of the pixels 14 disposed in the designated horizontal line I in the optical black region 40, and calculates the average value of the read voltage values, and makes this calculated average value set as a black level reference voltage. This black level reference voltage is stored in a predetermined capacitor. And at every time when voltage values of pixels 12' in the next horizontal line I+1 in the pixel reading region 50 are read, at the time right before reading one of the pixels 12', the black level reference voltage stored in the predetermined capacitor is read and this read black level reference voltage is made to transfer to a designated reference power source section (not shown). And the black level reference voltage set in the reference power source section corrects the voltage value of the pixel 12' read after this.

Next, a second embodiment of the MOS type image sensor of the present invention is explained. The basic structure of the second embodiment is the same that the first embodiment has. However, at the second embodiment, the vertical line finished flag F is made to be a trigger to start to read pixels 14 in the optical black region 40 (OB reading) as the same as the first embodiment, and also at the same time the vertical line finished flag F is outputted to the OB correction circuit 4 in the camera system 100.

At the first embodiment, at the local access or the random access, the number of signals of one horizontal line to be read is decided by the address AD inputted from the outside and is not always to be a constant number. And the final signal of one horizontal line to be read every horizontal line is a pixel signal read from the optical black region 40. Therefore, in order that the camera system 100 knows the reading start timing of the optical black region 40, the camera system 100 needs to provide an additional circuit. That is, the additional circuit of the camera system 100 counts the number of pixels 12' to be read of one horizontal line beforehand by the address AD inputted from the outside at the local access or the random access, and generates a reading start timing of the optical black region 40.

Therefore, at the second embodiment, the vertical line finished flag F is also outputted to the OB correction circuit 4 in the camera system 100. And by using this vertical line finished flag F as a trigger, the reading start information of the optical black region 40 is inputted to the OB correction circuit 4. With this, regardless of the difference of the number of pixels 12' of one horizontal line, the camera system 100 can know the reading start timing of the optical black region 40. Therefore, the camera system 100 can be simplified.

At the second embodiment, the vertical line finished flag F is used as the trigger for the reading start signal of the OB correction circuit 4. However, a reading start selection signal of an arbitrary optical black region 40 can be used as an OB reading trigger inputting to the OB correction circuit 4.

Further, at the first and second embodiments of the present invention, the optical black region 40 is disposed at the right end in the pixel array region 11. However, the optical black region 40 can be disposed not at the right end in the pixel array 11 depending on an image sensor using in the camera system 100. In this case, at the local access or the random access, at the time when an arbitrary horizontal line and an arbitrary vertical line are read, every line and every pixel can be read by using the processes mentioned above at the first and second embodiment of the present invention.

A pixel reading method used an image sensor of the present invention provides following processes. In this method, basically, the image sensor is a MOS type image sensor, and the MOS type image sensor provides a pixel array region and an optical black region disposed at the one end in the pixel array region. The processes are a mode selecting process, a pixel reading region deciding process, a horizontal line selecting process, an information in a designated horizontal line in a pixel reading region reading process, an OB pixel reading process, a different horizontal line selecting process, an information in the different horizontal line in the pixel reading region reading process, an OB pixel in the different horizontal line reading process, and a process continuing the horizontal line selecting process, the information in the horizontal line in the pixel reading region reading process, and the OB pixel in the horizontal line reading process until that the horizontal line reaches to the end line in the pixel reading region. The mode selecting process selects a local access mode or a random access mode or a frame access mode. The pixel reading region deciding process decides a pixel reading region, in which one or more pixels whose information is read in the pixel array region are disposed, in case that the local access mode or the random access mode is activated. The horizontal line selecting process selects one horizontal line having a designated horizontal line address in the pixel reading region. The information in a designated horizontal line in a pixel reading region reading process reads information of one or more pixels existing in the selected one horizontal line in the pixel reading region. The OB pixel reading process reads information of one or more pixels existing in the selected one horizontal line in the optical black region, after that the information of the one or more pixels existing in the pixel reading region in the selected one horizontal line was read. The different horizontal line selecting process selects a different horizontal line having a different horizontal line address from the selected horizontal line address in the pixel reading region. The information in the different horizontal line in the pixel reading region reading process reads information of the one or more pixels existing in the selected different one horizontal line in the pixel reading region. The OB pixel in the different horizontal line reading process reads information of one or more pixels existing in the selected different one horizontal line in the optical black region, after that the information of the one or more pixels existing in the selected different one horizontal line in the pixel reading region was read.

Furthermore, at the pixel reading method used the MOS type image sensor 1 of the present invention, a pixel information read value correcting process is provided, when information of one or more pixels in a selected horizontal line in the pixel reading region is read. The pixel information read value correcting process corrects the read value by referring to the information of the pixels in a previous different horizontal line in the optical black region read right before that the pixel information in the horizontal line in the pixel reading region would be read, Moreover, at the pixel reading method used the MOS type image sensor 1 of the present invention, a vertical line selection finished flag is generated corresponding to the final vertical line address selection at a designated selected horizontal line address in the pixel reading region. With this, the pixel information in the optical black region having the designated selected horizontal line address is read, and the vertical line finished flag can be utilized as the trigger for correcting the pixel information read value correction process.

As mentioned above, at the pixel reading method used the MOS type image sensor of the present invention, the structure mentioned above is adopted. Therefore, even at the time when the local access or the random access is selected, the optical black region 40 being the black level for the reading signals are surely read every horizontal line. Consequently, an effect that the accuracy of the black level is increased can be obtained.

Furthermore, the process for the optical black region can be the same between the frame access mode in which the OB cells are automatically read every horizontal line because all the pixels are read and the local access mode or the random access mode in which a certain number of OB cells are surely read until the horizontal line ends. Therefore, an effect that the structure of the camera system can be simplified is obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image sensor, which is a MOS type image sensor composed of a pixel array region and an optical black region disposed at the one end in said pixel array region, comprising:

a mode selection means for selecting a local access mode that selects a local part of said pixel array region or a random access mode that selects a part of said pixel array region at random or a frame access mode that selects all of said pixel array region; and a pixel reading region deciding means for deciding a pixel reading region in which one or more pixels whose information is read are disposed in said pixel array region, in case that said mode selection means selects said local access mode or said random access mode, wherein:

every one selected horizontal line address in said pixel reading region, information of said one or more pixels in said selected horizontal line address in said pixel reading region is read; and after this, information of one or more pixels in said selected one horizontal line address in said optical black region is read.

2. An image sensor, which is a MOS type image sensor composed of a pixel array region and an optical black region disposed at the one end in said pixel array region, comprising:

a mode selection means for selecting a local access mode that selects a local part of said pixel array region or a random access mode that selects a part of said pixel array region at random or a frame access mode that selects all of said pixel array region;

a pixel reading region deciding means for deciding a pixel reading region in which one or more pixels whose information is read are disposed in said pixel array region, in case that said mode selection means selects said local access mode or said random access mode; and a control means for controlling to read information of one or more pixels in said pixel reading region and said optical black region, wherein:

said control means controls operation of:
sequentially reading information of said one or more pixels having a designated horizontal line address in said pixel reading region in said pixel array region, after this;
sequentially reading information of said one or more pixels having said designated horizontal line address in said optical black region, after this;
sequentially reading information of one or more pixels having a different designated horizontal line address in said pixel reading region in said pixel array region, after this;
sequentially reading information of one or more pixels having said different designated horizontal line address in said optical black region, after this;
operation of said sequentially reading information is continued until said designated horizontal address reaches the end.

3. An image sensor, which is a MOS type image sensor composed of a pixel array region and an optical black region disposed at the one end in said pixel array region, comprising:

a mode selection means for selecting a local access mode that selects a local part of said pixel array region or a random access mode that selects a part of said pixel array region at random or a frame access mode that selects all of said pixel array region;

a pixel reading region deciding means for deciding a pixel reading region in which one or more pixels whose information is read are disposed in said pixel array region, in case that said mode selection means selects said local access mode or said random access mode; and a control means for controlling to read information of one or more pixels in said pixel reading region and said optical black region, wherein:
said control means controls operation of:
selecting one horizontal line having a designated horizontal line address in said pixel reading region;
reading information of one or more pixels having said designated horizontal line address in said pixel reading region in said pixel array region, after this;
reading information of one or more pixels having the same designated horizontal line address in said optical black region, after this;
selecting one different horizontal line having a different designated horizontal line address in said pixel reading region;
reading information of one or more pixels having said different designated horizontal line address in said pixel reading region in said pixel array region, after this;
reading information of one or more pixels having the same different designated horizontal line address in said optical black region, after this;
said selecting one horizontal line and said reading information are continued until said designated horizontal address reaches the end.

4. An image sensor in accordance with claim 1, further comprising:
a pixel information read value correction means which corrects read values of said one or more pixels in said pixel reading region, by referring to information of pixels having a different horizontal line address in said optical black region read right before the time when information of one or more pixels having said designated selected horizontal address in said pixel reading region would be read, when information of one or more pixels having said designated selected horizontal line address in said pixel reading region is read; and
a vertical line finished flag generating means which generates a vertical line finished flag when a final vertical line was selected in said designated selected horizontal line in said pixel reading region, and makes information of one or more pixels having said designated selected horizontal line in said optical black region read, and also outputs said vertical line finished flag to said pixel information read value correction means.

5. An image sensor in accordance with claim 2, further comprising:
a pixel information read value correction means which corrects read values of said one or more pixels in said pixel reading region, by referring to information of pixels having a different horizontal line address in said optical black region read right before the time when information of one or more pixels having said designated selected horizontal address in said pixel reading region would be read, when information of one or more pixels having said designated selected horizontal line address in said pixel reading region is read; and
a vertical line finished flag generating means which generates a vertical line finished flag when a final vertical line was selected in said designated selected horizontal line in said pixel reading region, and makes information of one or more pixels having said designated selected horizontal line in said optical black region read, and also outputs said vertical line finished flag to said pixel information read value correction means.

6. An image sensor in accordance with claim 3, further comprising:
a pixel information read value correction means which corrects read values of said one or more pixels in said pixel reading region, by referring to information of pixels having a different horizontal line address in said optical black region read right before the time when information of one or more pixels having said designated selected horizontal address in said pixel reading region would be read, when information of one or more pixels having said designated selected horizontal line address in said pixel reading region is read; and
a vertical line finished flag generating means which generates a vertical line finished flag when a final vertical line was selected in said designated selected horizontal line in said pixel reading region, and makes information of one or more pixels having said designated selected horizontal line in said optical black region read, and also outputs said vertical line finished flag to said pixel information read value correction means.

7. A pixel reading method, at an image sensor, which is a MOS type image sensor composed of a pixel array region and an optical black region disposed at the one end in said pixel array region, comprising the steps of:
selecting a local access mode that selects a local part of said pixel array region or a random access mode that selects a part of said pixel array region at random or a frame access mode that selects all of said pixel array region;
deciding a pixel reading region in which one or more pixels whose information is read are disposed in said pixel array region, in case that said local access mode or said random access mode is activated; and
selecting one horizontal line having a designated horizontal line address in said pixel reading region;
reading information of one or more pixels having said designated horizontal line address in said pixel reading region in said pixel array region;
reading information of one or more pixels having the same designated horizontal line address in said optical black region;
selecting one different horizontal line having a different designated horizontal line address in said pixel reading region;
reading information of one or more pixels having said different designated horizontal line address in said pixel reading region in said pixel array region;
reading information of one or more pixels having the same different designated horizontal line address in said optical black region; and
continuing said selecting one horizontal line and reading information of one or more pixels in said pixel reading region and reading information of one or more pixels in said optical black region in said selected horizontal line until said designated horizontal address reaches the end.

8. A pixel reading method in accordance with claim 7, further comprising the steps of:

correcting read values of said one or more pixels in said pixel reading region, by referring to information of pixels having a different horizontal line address in said optical black region read right before the time when information of one or more pixels having said designated selected horizontal address in said pixel reading region would be read, when information of one or more pixels having said designated selected horizontal line address in said pixel reading region is read; and generating a vertical line finished flag when a final vertical line was selected in said designated selected horizontal line in said pixel reading region, and makes information of one or more pixels having said designated selected horizontal line in said optical black region read, and also outputting said vertical line finished flag to said pixel information read value correction step.

* * * * *